United States Patent
Klindworth

[11] Patent Number: 6,126,238
[45] Date of Patent: Oct. 3, 2000

[54] HEAD REST FOR A VEHICLE SEAT

[75] Inventor: Jan Klindworth, Munich, Germany

[73] Assignee: INA Walzlager Schaeffler oHG, Germany

[21] Appl. No.: 09/284,326

[22] PCT Filed: Oct. 8, 1997

[86] PCT No.: PCT/EP97/05226

§ 371 Date: Apr. 9, 1999

§ 102(e) Date: Apr. 9, 1999

[87] PCT Pub. No.: WO98/17496

PCT Pub. Date: Apr. 30, 1998

[30] Foreign Application Priority Data

Oct. 17, 1996 [DE] Germany .......................... 196 42 894

[51] Int. Cl.[7] .................................................. A47C 1/036
[52] U.S. Cl. ................ 297/410; 297/216.12; 248/297.31
[58] Field of Search .................................. 297/391, 410, 297/216.12; 248/297.31, 125.3

[56] References Cited

U.S. PATENT DOCUMENTS 4,411,470 10/1983 Nishimura et al. .
4,568,123 2/1986 Yasui et al. .............................. 297/410
4,577,904 3/1986 Wiese et al. .

FOREIGN PATENT DOCUMENTS 2671587 7/1992 France .
3318866 11/1984 Germany .
7313288 5/1995 Japan .

Primary Examiner—Anthony D. Barfield
Attorney, Agent, or Firm—Bierman, Muserlian and Lucas

[57] ABSTRACT

A head rest (35) for a vehicle seat is vertically adjustable relative to a back rest (36) of the vehicle seat. The head rest (35) is fixed on supporting rods (37, 38) which are longitudinally displaceable in a fixed reception (40) arranged in the back rest (36). A clamping element (10) locks the head rest (35) in a defined position relative to the reception. According to the invention, the supporting rods (37 and 38) are prevented from being pushed inwards during an accident by the fact that the locking element (10) is configured as an overrunning clutch(22, 16, 26) acting in a linear direction of movement which, in a locked position, prevents at least one (38) of the supporting rods from being pushed into the reception (40), and the locking element can be locked and unlocked by an actuating element.

10 Claims, 5 Drawing Sheets

HEAD REST FOR A VEHICLE SEAT

This application is a 371 of PCT/EP97/05526 filed Oct. 8, 1997.

The invention concerns a head rest for a vehicle seat, which head rest is fixed on supporting rods, at least one of the supporting rods being configured as a clamping element which cooperates with a locking element arranged in a fixed reception for the supporting rod in a back rest of the vehicle seat.

STATE OF THE ART

In a locking device for vertically adjustable head rests known from DE 33 01 073 C2, the supporting rails which are slidably guided in a guide sleeve comprise at least in their end region, a catch recess into which a deformable leg spring engages. In this way, the head rest along with the supporting rods is intended to be prevented from being pulled fully out of the back rest of the vehicle seat.

In other known devices for the height adjustment of head rests of vehicle seats, the supporting rods comprise uniformly spaced catch recesses into which a spring-loaded catch engages. An adjustment of the head rest therefore requires a force large enough to undo the locking of the head rest. The occupants are thus able to adjust the position of the back rests to suit their individual statures. Unfortunately, such adjusting devices do not offer adequate safety in the case of an accident. During an accident involving a rear-end collision of the vehicle, the head of the occupant is hurled backwards towards the head rest. In such a situation, especially if the head rest is adjusted at a too low position, there is the danger that the head rest which is anchored in the vehicle seat be pushed in and thus cause an overstretching of the cervical spine, that is to say, a trauma. In more modern automobiles, it is, in particular, a forward movement of the head of a vehicle occupant that is stopped and cushioned by air bags, but no equally suitable safety device has been developed thus far for a backward movement of the head of a vehicle occupant.

The other document, U.S. Pat. No. 4,411,470 A, cited in the International Preliminary Examination Report discloses a locking device in which the head rest is held in place by frictional engagement means. These frictional engagement means consist, among other things, as shown in FIGS. 9, 10a and 10b, of a compression spring radially surrounding the supporting rod concerned which is biased radially inwards by an inclined surface during locking. This is meant to hold the supporting rod in the respective position by frictional engagement. On the one hand, such a head rest locking arrangement does not offer adequate protection during an accident against the inward movement of the supporting rods described above, and on the other hand, this type of locking is also extremely uncomfortable because, depending on the position of the head rest, not enough space is available for a manual turning of the element used for clamping.

THE INVENTION

The object of the invention is to obviate the aforesaid problems and thus create an individually adjustable head rest which is reliably prevented from being pushed into the back rest of the vehicle seat during an accident.

This object is achieved with the characterizing features of claim 1 according to which the locking element is configured as an overrunning clutch acting in a linear direction of movement which, in a locked position, prevents the supporting rod from being pushed into the reception and which can be unlocked by an actuating element. Consequently, in an unlocked position of the locking element, the head rest can be individually adjusted without any problem to the height of the driver or of the passenger. In the locked position of the locking element, however, the head rest is locked in such a manner that it cannot be displaced towards the back rest even during an accident.

According to a further proposition of the invention, a displacement barrier for the clamping element extending through a switching ring and a clamping body support is created by a suitable configuration of the clamping body support and the switching ring, with spring-loaded clamping bodies arranged therebetween. By a controlled turning of the switching ring, the spring-loaded clamping bodies are brought into clamping contact with the locking element and thus prevent a movement of the locking element in one of the two possible axial directions. The present device has been specially conceived for the locking of a head rest of a vehicle seat and offers increased safety to the occupants in the case of an accident. Since the head rest cannot be pushed into the back rest when the head of an occupant bangs against it, the danger of a trauma of the cervical spine is eliminated.

Preferred embodiments of the inventions are characterized in the rest of the claims.

In a preferred embodiment, the clamping bodies are three balls arranged at substantially equal circumferential angles of the clamping body support. The number of clamping bodies and the choice of the geometry are closely connected to the forces which have to be transmitted between the clamping bodies and the clamping element due to Hertzian stress. The use of balls is the simplest and most common solution, and the use of three balls arranged on the periphery has the advantage that further adjusting and arresting devices can be arranged on the clamping element without prejudicing the efficiency of the clamping body locking device.

These arresting devices are intended to hold the head rests in the desired position during normal driving.

Preferably, the switching ring is ball-mounted on the clamping body support. This mounting permits an easy relative rotation between the clamping body support and the switching ring with a minimum of friction between the two elements. This assures that, on exceeding of a defined torque level acting on the switching ring, this ring is reliably moved and such an actuation is guaranteed even after a long period of non-operation.

The clamping body support and the switching ring are made preferably of a plastic or of a sintered metal. This enables a very economic production of the clamping body locking device in large numbers.

According to a preferred embodiment, a mass body is fixed on the switching ring. When a defined acceleration or deceleration is exceeded, the inertia of this mass body causes the switching ring to turn relative to the clamping body support thus activating the clamping body locking device. When the clamping body locking device is used in accordance to the invention as an axially acting lock for the head rest of a vehicle seat, it can be activated purely mechanically without the help of electric signals as soon as an excessive acceleration or deceleration acts on the eccentrically arranged inert mass body.

Alternatively, the movement of the switching ring may also be brought about by an electric signal. This embodiment is particularly suitable when the activation of the clamping body locking device is a part of an overall operational concept which includes the controlled activation of other elements as well. In the concrete example of the head rest of a vehicle seat, the electric signal can be delivered, for example, by the ABS sensor or by the popping-up of the safety roll bar.

According to a preferred embodiment of the invention, the running surface is made up of operational sections and locking sections, the operational sections being raised relative to the locking sections and comprising a flat trough. The flat trough in which the clamping body is situated in the unlocked state of clamping body locking device defines the mechanical activation resistance of the clamping body locking device because the clamping bodies have to be lifted against the biasing force of the springs out of the depth of the flat troughs over an adjoining slightly raised portion before they can move on to the locking sections under a partial relaxation of the springs.

BRIEF DESCRIPTION OF THE DRAWINGS

The invention is described in the following with the help of an example of embodiment illustrated in the drawings in which.

METHOD OF CARRYING OUT THE INVENTION

Figure 1:
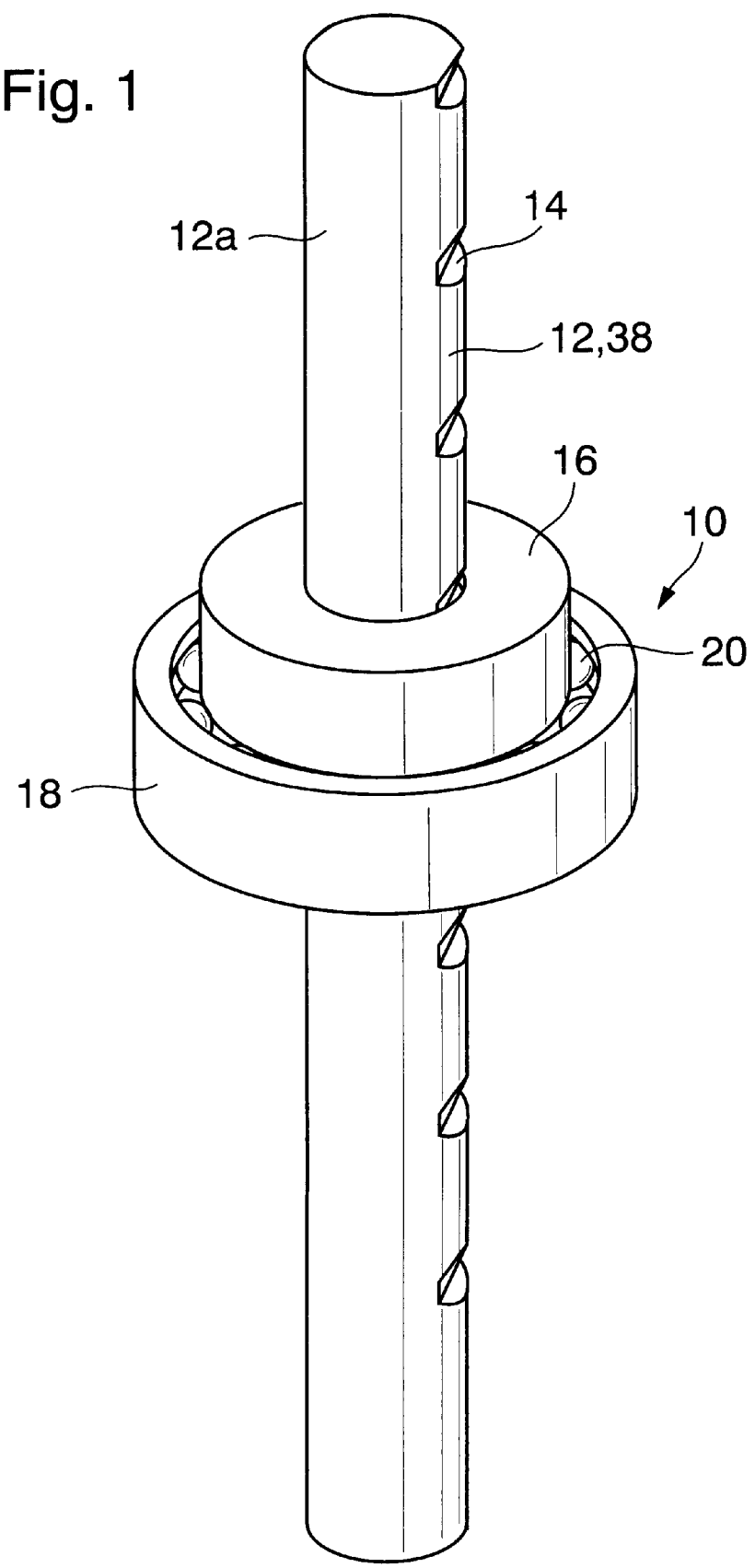
FIG. 1 is a schematic view of the clamping body locking device of the invention.
Figure 5:
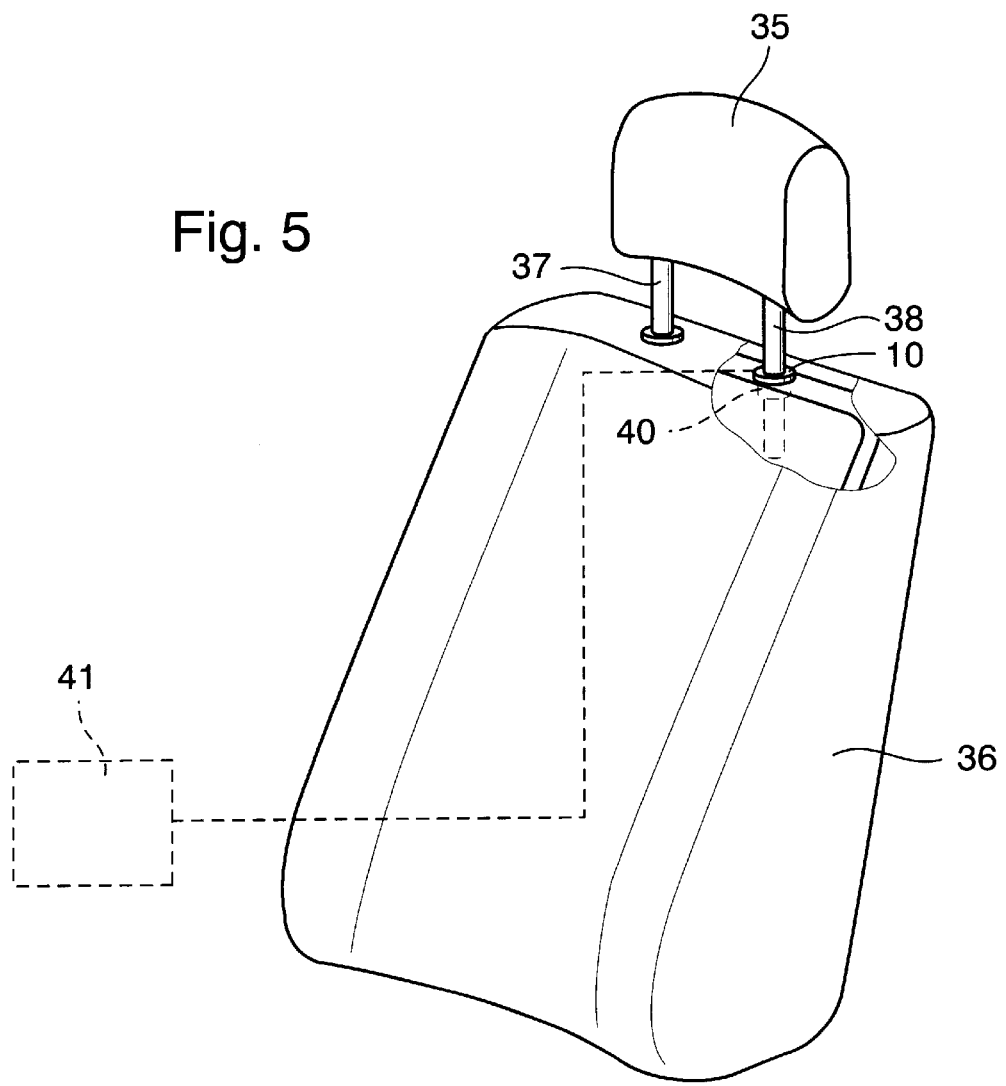
FIG. 5 shows a back rest of a vehicle seat having a vertically adjustable head rest.

FIG. 1 is a schematic representation of the locking element 10 of the invention configured in the present example as a clamping element 12 for use, as shown in FIG. 5, as a supporting rod 38 for anchoring a head rest in a vehicle seat. The clamping element 12 is made of metal, and preferably of solid material. The clamping element 12 is provided at regular intervals with catch grooves 14 which have no function in connection with the clamping body locking device but rather cooperate with a spring-biased catch (not shown) which permits the vertical adjustment of the clamping element 12 and a subsequent locking in the re-adjusted position without the use of tools.

The locking element 10 substantially comprises a clamping body support 16 and a switching ring 18 rotatable relative to the clamping body support 16. The clamping body support 16 and the switching ring 18 are arranged coaxially to each other, and the switching ring 18 is mounted on the clamping body support 16 preferably with the help of balls. One of the two rings is fixed in place, while the other ring is rotatable relative to the first ring. Rotation can be provoked in many different ways. In the present case of a uniaxially acting clamping body locking device for blocking the inward movement of a head rest into a vehicle seat, the clamping body support 16 can be fixed in the vehicle seat and a weight 18a (see FIG. 4) can be attached to switching ring 18 on one side. On occurrence of acceleration or deceleration forces, the inertia of the weight 18a leads to a rotation of the switching ring 18 relative to the clamping body support 16.

Both the clamping body support 16 and the switching ring 18 may be made of metal or of a plastic. A particularly suitable method for making these components of a plastic is injection molding, and if they are to be made of metal, a sintered material, for example, qualifies very well. The choice of the material of the clamping body support 16 as well as that of the switching ring 18 obviously depends on the clamping forces to be transmitted, but also on the numbers in which the components are produced.

Figure 2:
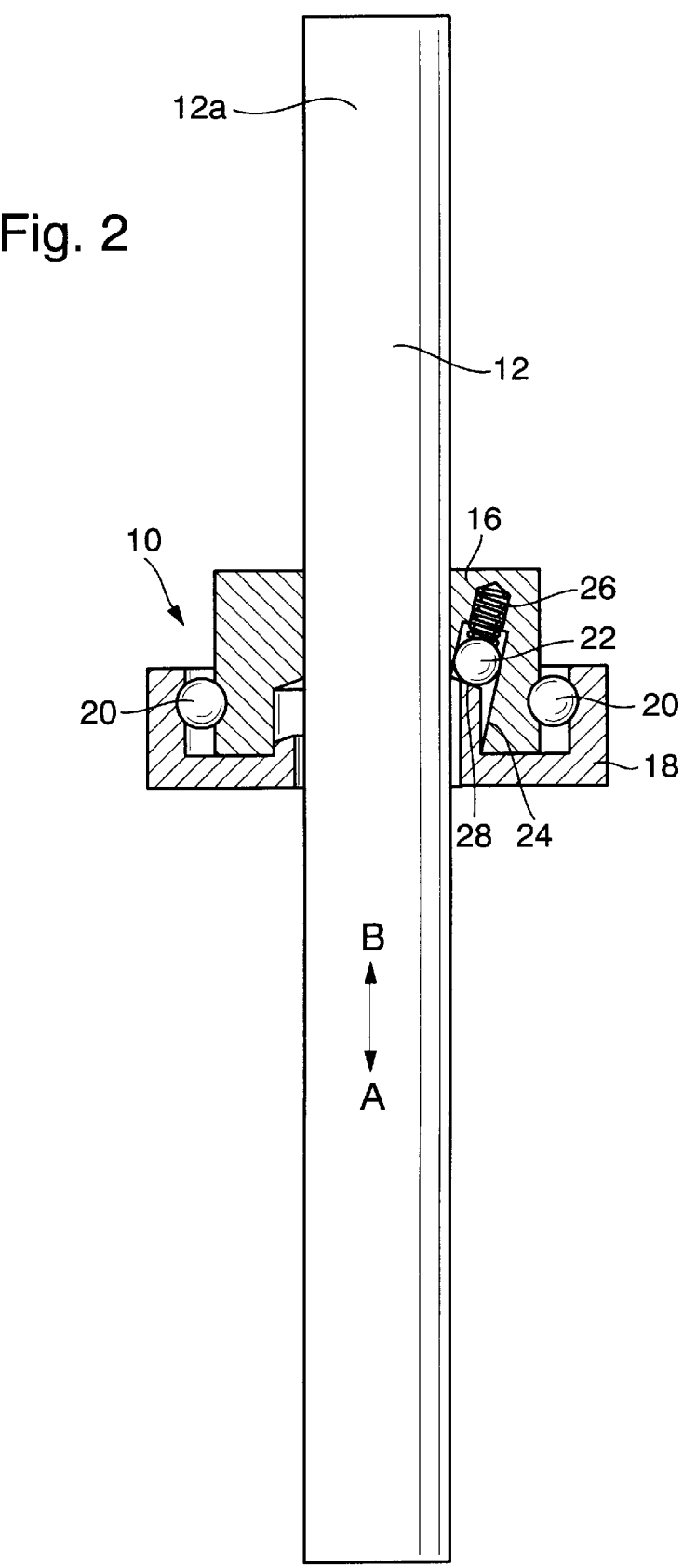
FIG. 2 is a sectional view of the device of FIG. 1 with the clamping body locking device unactivated.

As can be seen in FIG. 2, in which, as also in the following figures, identical components are designated by the same reference numerals, a plurality of clamping bodies 22, preferably configured as balls, are arranged between the clamping body support 16 and the switching ring 18. The clamping bodies 22 referred to in the following as clamping rollers, are situated in a clamping body reception 24 formed in the clamping body support 16. The clamping body reception 24 is adapted to the geometry of the clamping body and, in the case of clamping rollers, is made as a bore which is slightly inclined in radial direction but extends substantially axially in the clamping body support. The most suitable inclination is determined from the coefficient of friction corresponding to the tangent of the angle of friction. For angles of friction which are commonly situated in the range of 3 to 4 degrees, an inclination of 6 to 8 degrees is obtained, in which range the device operates reliably. Besides being guided in the clamping body reception 24, the clamping rollers are additionally held in place by a compression spring 26 and a running surface 28 in the switching ring. The compression springs 26 are fixed in the clamping body reception 24.

The inner diameter of the clamping body support 16 and the outer diameter of the clamping element 12 are matched to each other so as to obtain a clearance fit between the two components, so that, when the locking element is inactive, the clamping element 12 can be axially displaced both in the direction of the arrow A as well as in the direction of the arrow B. The connection between the clamping body support 16 and the switching ring is represented schematically in FIG. 2. However, in addition to the ball-mounting shown in the figure, there are many different ways of connecting these two components to each other and simultaneously configuring them for relative rotation.

Figure 3:
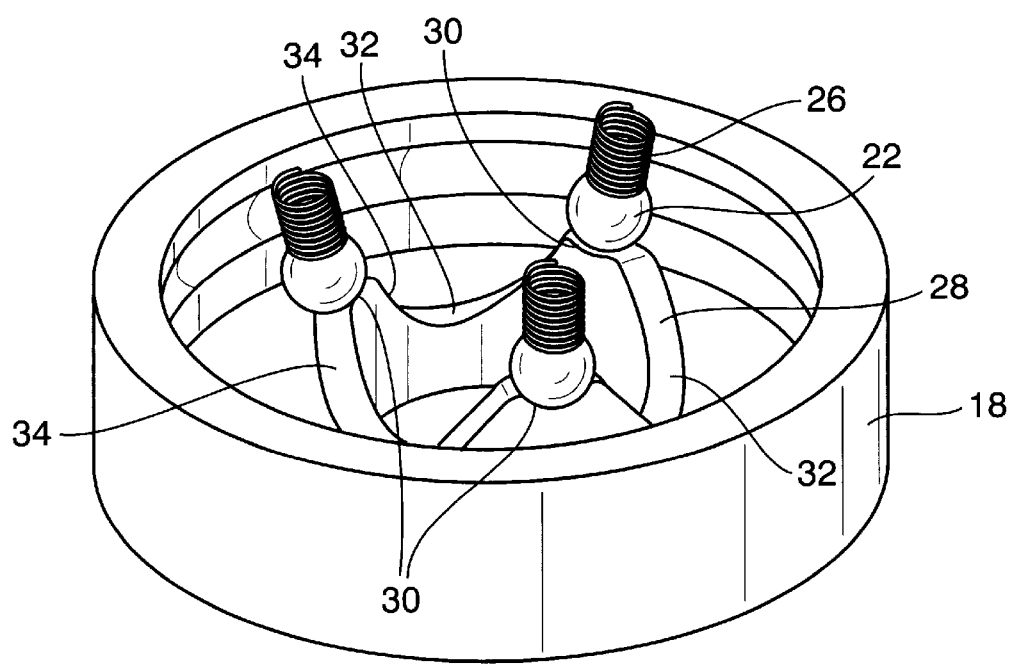
FIG. 3 shows the switching ring including the running surface and the spring-loaded clamping bodies in contact therewith.

FIG. 3 shows one possible embodiment of the switching ring 18 in which the running surface 28 is of particular interest. This running surface can be divided into operational sections 30 and locking sections 32. In the example shown in FIG. 3, each of the three clamping rollers 22 is situated in an operational section 30 of the running surface 28 and thus corresponds to the position shown in FIG. 2 in which the clamping body locking device is not activated.

As can be clearly seen in FIG. 3, the operational sections 30 are slightly trough-shaped, i.e. when the switching ring 18 turns in any direction of rotation, a resistance has to be overcome due to the relative elevation in the transition region from the operational sections 30 to the locking sections 32 because the compression springs 26 have to be more strongly compressed than in the operational sections 30. When this resistance has been overcome, the clamping bodies 22 are displaced after a rotation of the switching ring 18 relative to the associated clamping body support 16 into the region of the locking sections in which the locking element is activated. After the initial resistance has been overcome, the relative rotation between the switching ring 18 and the clamping body support 16 is assisted by the action of the springs 26 which produce an additional component of rotation during the motion of the clamping bodies 22 on the inclined sliding surfaces 34. Thus, due to the ball-mounting of the two relatively movable rings, and with the cooperation of the compression springs 26, the locking element can be very easily transferred into the activated, i.e. locked state after an adjustable, initial resistance has been overcome.

Figure 4:
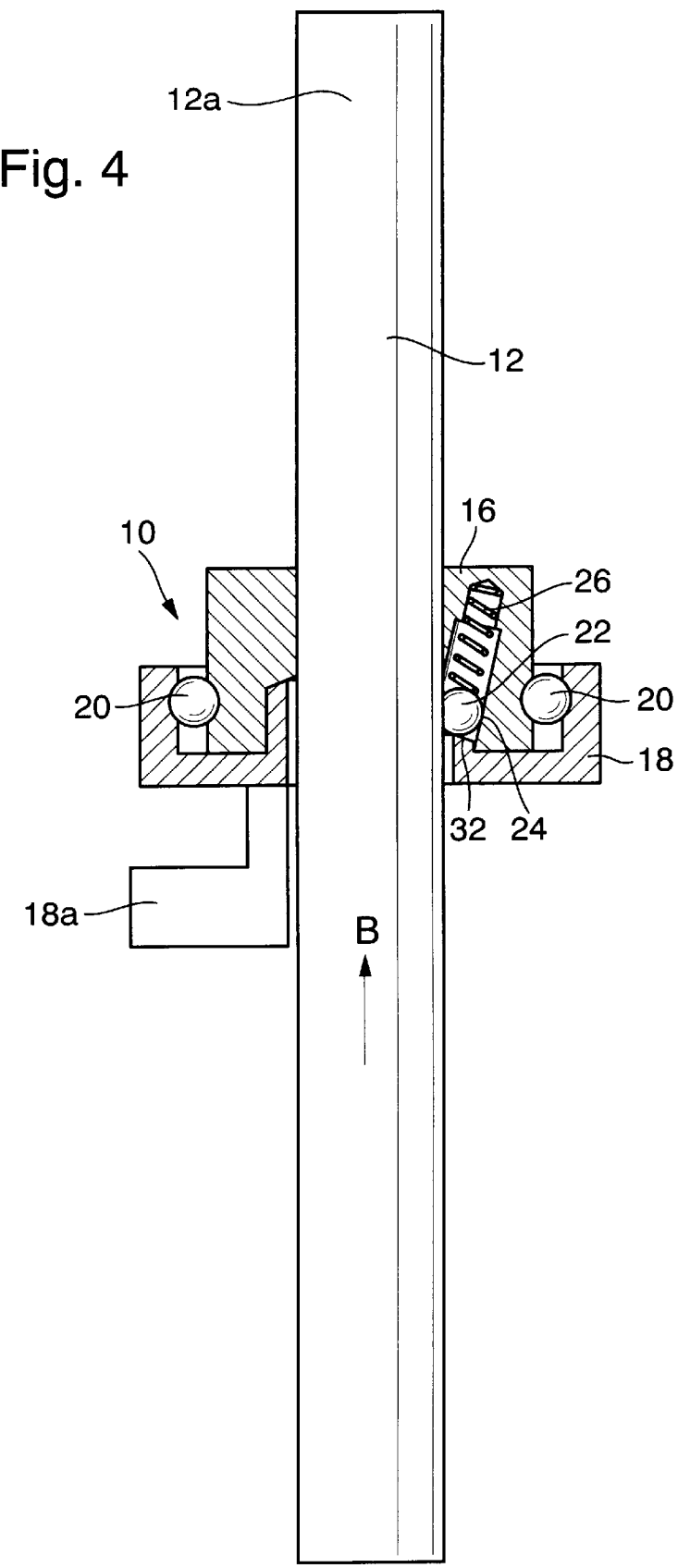
FIG. 4 is a view similar to FIG. 1 but with the clamping body locking device activated.

FIG. 4 shows the locked, i.e. activated state of the device 10. The clamping roller 22 has moved towards the clamping element 12 and presses against the clamping element 12. The compression spring 26 holds the clamping roller in this position and a movement of the clamping element 12 is only possible in the direction of the arrow B. A movement in a direction opposite to that of the arrow B leads to a strong clamping of the clamping roller 22 between the clamping body reception 24 and the clamping element 12 so that a movement opposed to the direction of the arrow B is effectively prevented.

Finally, FIG. 5 shows a head rest 35 which can be vertically adjusted relative to a back rest 36 of a vehicle seat, not shown, with the help of two supporting rods 37 and 38. For this purpose, receptions 40 are arranged in the frame of the back rest 36, within which receptions, the supporting rods 37 and 38 on which the head rest is fixed can be displaced. Installed in at least one of these receptions 40 is the locking element 10 described hereinbefore which cooperates with the supporting rod 38 that acts as a clamping element 12. The locking element 10 can be activated through a central control unit 41 of an ABS system or through a triggering device of an air bag.

As already mentioned, one possibility of making the switching ring 18 of the locking element 10 rotate is the eccentric attachment of a weight whose inertia causes the switching ring to rotate relative to the clamping body support on occurrence of high acceleration or deceleration forces. Alternatively, a suitable rotation device for the switching ring adapted to be activated, for example, electrically or by a signal coming from the ABS sensor can likewise be installed in the region of the back rest of the vehicle seat. Since the locking element used for blocking the inward movement of a head rest of a vehicle seat is a device which has to be activated only in an emergency, the clamping body support and the switching ring can be made of a plastic. If, after the activation of the device and the action of an axial force on the clamping element, the components are deformed, this is no problem because, compared to other damage usually caused to the vehicle, this is only a minor matter and, moreover, such a damage in connection with an accident occurs only rarely and, hopefully, not at all. The use of three clamping rollers as shown in FIG. 3 permits, independently of the clamping body locking device, an axial adjustment of the height of the head rest by the cooperation of the catch recesses 14 (see FIG. 1) with suitable catch elements. In this way, an acceleration-dependent locking of the head rest 35 is achieved and the safety of the vehicle occupants increased.

I claim:

1. A head rest for a vehicle seat having a head support (35) fixed on supporting rods (37, 38), at least one of which supporting rods (37, 38) is configured as a clamping element and cooperates with a locking element (10) which is disposed in a fixed reception (40) for the supporting rod (37, 38) adapted to be arranged in a back rest (36) of the vehicle seat, characterized in that the locking element (10) is configured as an overrunning clutch (22, 16, 26) acting in a linear direction of movement and comprising spring-loaded clamping bodies (22) which radially surround the supporting rod (37, 38), and, in a locked position, the overrunning clutch (22, 16, 26) prevents the supporting rod (37, 38) from being pushed into the reception (40) and said overrunning clutch can be unlocked by an actuating element.

2. A head rest for a vehicle seat according to claim 1, characterized in that the overrunning clutch comprises:
   a clamping body support (16) and a switching ring (18) arranged coaxially to the clamping body support (16) for rotation relative thereto;
   a clamping element (12) arranged coaxially to the clamping body support (16) and to the switching ring (18) and extending through the clamping body support (16) and the switching ring (18); and
   a running surface (28) of the switching ring (18), against which running surface (28) the spring-loaded clamping bodies (22) bear, and, depending on an angular position of the switching ring (18) relative to the clamping body support (16) are in clamping contact with the clamping element (12).

3. A head rest for a vehicle seat according to claim 2, characterized in that the clamping bodies (22) are configured as balls.

4. A head rest for a vehicle seat according to claim 3, characterized in that the clamping bodies (22) are three balls arranged at substantially equal circumferential angles of the clamping body support (16).

5. A head rest for a vehicle seat according to claim 2, characterized in that the switching ring (18) is mounted on the clamping body support (16) through a ball bearing (20).

6. A head rest for a vehicle seat according to claim 2, characterized in that the clamping body support (16) and the switching ring (18) are made from one of a plastic or a sintered metal.

7. A head rest for a vehicle seat according to claim 2, characterized in that a mass body is fixed eccentrically and rigidly on the switching ring (18).

8. A head rest for a vehicle seat according to claim 2, characterized in that the movement of the switching ring can be triggered by an electric signal.

9. A head rest for a vehicle seat according to claim 8, characterized in that the rotation of the switching ring (18) relative to the clamping body ring (16) in locking direction is triggered by an ABS sensor.

10. A head rest for a vehicle seat according to claim 2, characterized in that the running surface (28) comprises operational sections (30) and locking sections (32), wherein,
   on installation of the clamping body support (16) over the switching ring (18), the operational sections (30) are elevated relative to the locking sections (32), and
   each operational section (30) comprises a flat trough.

* * * * *